US012094671B2

(12) United States Patent
Barber

(10) Patent No.: US 12,094,671 B2
(45) Date of Patent: Sep. 17, 2024

(54) ELECTRICAL SWITCH GEAR ASSEMBLIES WITH FOLDING FRAMES AND METHODS OF INSTALLING

(71) Applicant: Hubbell Incorporated, Shelton, CT (US)

(72) Inventor: Richard Gordon Barber, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 120 days.

(21) Appl. No.: 17/738,791

(22) Filed: May 6, 2022

(65) Prior Publication Data

US 2022/0359140 A1 Nov. 10, 2022

Related U.S. Application Data

(60) Provisional application No. 63/186,137, filed on May 9, 2021.

(51) Int. Cl.
*H01H 33/666* (2006.01)
*H01H 33/00* (2006.01)

(52) U.S. Cl.
CPC ...... *H01H 33/6664* (2013.01); *H01H 33/008* (2013.01); *H01H 2033/6665* (2013.01)

(58) Field of Classification Search
CPC ............. H01H 33/6664; H01H 33/008; H01H 33/122; H01H 33/121; H01H 2033/6665
USPC ... 200/48 R, 48 P, 48 A, 49, 61.58 R, 61.85, 200/50.01, 50.02, 50.11; 218/12, 11, 14, 218/118, 119; 361/602, 131
See application file for complete search history.

(56) References Cited

U.S. PATENT DOCUMENTS

| | | | | | |
|---|---|---|---|---|---|
| 3,350,520 | A * | 10/1967 | Perry | H01H 31/36 200/275 |
| 3,805,118 | A * | 4/1974 | Boney | H02B 5/00 174/161 R |
| 4,504,708 | A * | 3/1985 | Hartig | H01H 31/36 200/337 |
| 4,677,262 | A * | 6/1987 | Ramos | H01H 33/128 200/48 A |
| 4,752,859 | A * | 6/1988 | Chabala | H01H 33/02 200/48 R |
| 7,299,712 | B2 * | 11/2007 | Wang | H01H 3/3042 74/411 |
| 8,541,702 | B2 * | 9/2013 | Blalock | H01H 31/20 200/48 R |
| 9,355,797 | B1 | 5/2016 | Cleaveland et al. | |
| 10,128,067 | B1 | 11/2018 | Cleaveland et al. | |
| 10,515,772 | B2 * | 12/2019 | Liu | H01H 31/36 |
| 2013/0037399 | A1 | 2/2013 | Blalock | |

* cited by examiner

*Primary Examiner* — William A Bolton
(74) *Attorney, Agent, or Firm* — Ruggiero McAllister & McMahon LLC

(57) ABSTRACT

An electrical switch gear assembly is provided. The assembly includes two or more insulators, a frame, and a single pivot axis. The two or more insulators are connected to the frame. The frame has a first beam and a second beam with the single pivot axis securing the first and second beams to one another so that the first and second beams can move in a scissors action between a folded state and an unfolded state about the single pivot axis.

22 Claims, 11 Drawing Sheets

ELECTRICAL SWITCH GEAR ASSEMBLIES WITH FOLDING FRAMES AND METHODS OF INSTALLING

CROSS REFERENCE

This application claims the benefit of U.S. application Ser. No. 63/186,137, filed May 9, 2021 the contents of which are incorporated by reference herein.

BACKGROUND

1. Field of the Invention

The present disclosure is related to electrical switch gear assemblies. More particularly, the present disclosure is related to electrical switch gear assemblies with folding frames and methods of installing.

2. Description of Related Art

Electric switch gear assemblies generally include components such as, but not limited to, switches, insulators, and support frames. The insulators and switches are secured to the frames and the frames are supported by utility poles or other structures.

Due to the complexity of some switch gear assemblies, it can be desired for the components to be assembled and tested at the manufacturer instead of at the installation site. In this manner, switch gear assembly can be transported to the desired installation site as a single, assembled unit and can be quickly and easily secured to the utility pole or other structure.

Unfortunately, the large size of some switch gear, once assembled, can present a problem during delivery. Accordingly, it has been determined by the present disclosure that there is a need for electrical switch gear assemblies and methods of installing that overcome, alleviate, and/or mitigate one or more of the aforementioned and other deleterious effects of the prior art.

SUMMARY

An electrical switch gear assembly is provided. The assembly includes two or more insulators, a frame, and a single pivot axis. The two or more insulators are connected to the frame. The frame has a first beam and a second beam with the single pivot axis securing the first and second beams to one another so that the first and second beams can move in a scissors action between a folded state and an unfolded state about the single pivot axis.

In some embodiments either alone or together with any one or more of the aforementioned and/or after-mentioned embodiments, the frame is configured to mount to a structure and in an orientation selected from a group consisting of a horizontal mount, a vertical mount, and an inverted mount.

In some embodiments either alone or together with any one or more of the aforementioned and/or after-mentioned embodiments, the two or more insulators comprises at least one phase insulator and at least one central insulator.

In some embodiments either alone or together with any one or more of the aforementioned and/or after-mentioned embodiments, the two or more insulators comprises three phase insulators and one central insulator.

In some embodiments either alone or together with any one or more of the aforementioned and/or after-mentioned embodiments, the frame, in the unfolded state, has a T-shape.

In some embodiments either alone or together with any one or more of the aforementioned and/or after-mentioned embodiments, the frame, in the unfolded state, has a collapsed X-shape.

In some embodiments either alone or together with any one or more of the aforementioned and/or after-mentioned embodiments, the first beam, in the unfolded state, has portions on either side of the second beam.

In some embodiments either alone or together with any one or more of the aforementioned and/or after-mentioned embodiments, the frame, in the unfolded state, has an unfolded angle between the first and second beams of between 70 and 110 degrees.

In some embodiments either alone or together with any one or more of the aforementioned and/or after-mentioned embodiments, the frame, in the unfolded state, has an unfolded angle between the first and second beams of about 90 degrees.

In some embodiments either alone or together with any one or more of the aforementioned and/or after-mentioned embodiments, the frame, in the folded state, has a folded angle between the first and second beams of between larger than 0 degrees and less than 70 degrees.

In some embodiments either alone or together with any one or more of the aforementioned and/or after-mentioned embodiments, the frame, in the folded state, has a folded angle between the first and second beams of between 20 and 50 degrees.

In some embodiments either alone or together with any one or more of the aforementioned and/or after-mentioned embodiments, the first and second beams are offset from one another along the single pivot axis—with one of the at least two insulators is on the first beam and another of the at least two insulators being on the second beam.

In some embodiments either alone or together with any one or more of the aforementioned and/or after-mentioned embodiments, the assembly further includes a tap on each of the at least two insulators and a blade configured to connect/disconnect the taps to one another.

In some embodiments either alone or together with any one or more of the aforementioned and/or after-mentioned embodiments, the taps are coplanar to one another.

In some embodiments either alone or together with any one or more of the aforementioned and/or after-mentioned embodiments, the single pivot axis is at a location selected from a group consisting of through a center of the first and second beams, through a center of the first or second beams, and offset from a center of the first and second beams.

An electrical switch gear assembly is also provided that includes three tap insulators, one central insulator, and a frame. The three tap insulators and the one central insulator are connected to the frame. The frame has a first beam and a second beam and consists of a single pivot axis securing the first and second beams to one another so that the first and second beams can move in a scissors action between a folded state and an unfolded state about the single pivot axis.

In some embodiments either alone or together with any one or more of the aforementioned and/or after-mentioned embodiments, the first beam, in the unfolded state, has portions on either side of the second beam.

In some embodiments either alone or together with any one or more of the aforementioned and/or after-mentioned embodiments, one of the three tap insulators is on one of the portions, another of the three tap insulators is on another of the portions, a final of the three tap insulators is on the second beam, and the one central insulator is on the second beam.

A method of installing a switch gear assembly is also provided. The method includes pivoting first and second beams of a frame with respect to one another about single pivot axis from a folded state to an unfolded state, the frame having, in the unfolded state, portions of the first beam on either side of the second beam with a first tap insulator on one of the portions, a second tap insulator is on another of the portions, a third tap insulators is on the second beam, and a central insulator is on the second beam; and connecting blades between taps on each of the first, second, and third tap insulators to a corresponding number of taps on the central insulator.

In some embodiments either alone or together with any one or more of the aforementioned and/or after-mentioned embodiments, the method also includes securing the frame to a utility pole or support structure.

The above-described and other features and advantages of the present disclosure will be appreciated and understood by those skilled in the art from the following detailed description, drawings, and appended claims.

DETAILED DESCRIPTION

Figure 1A:
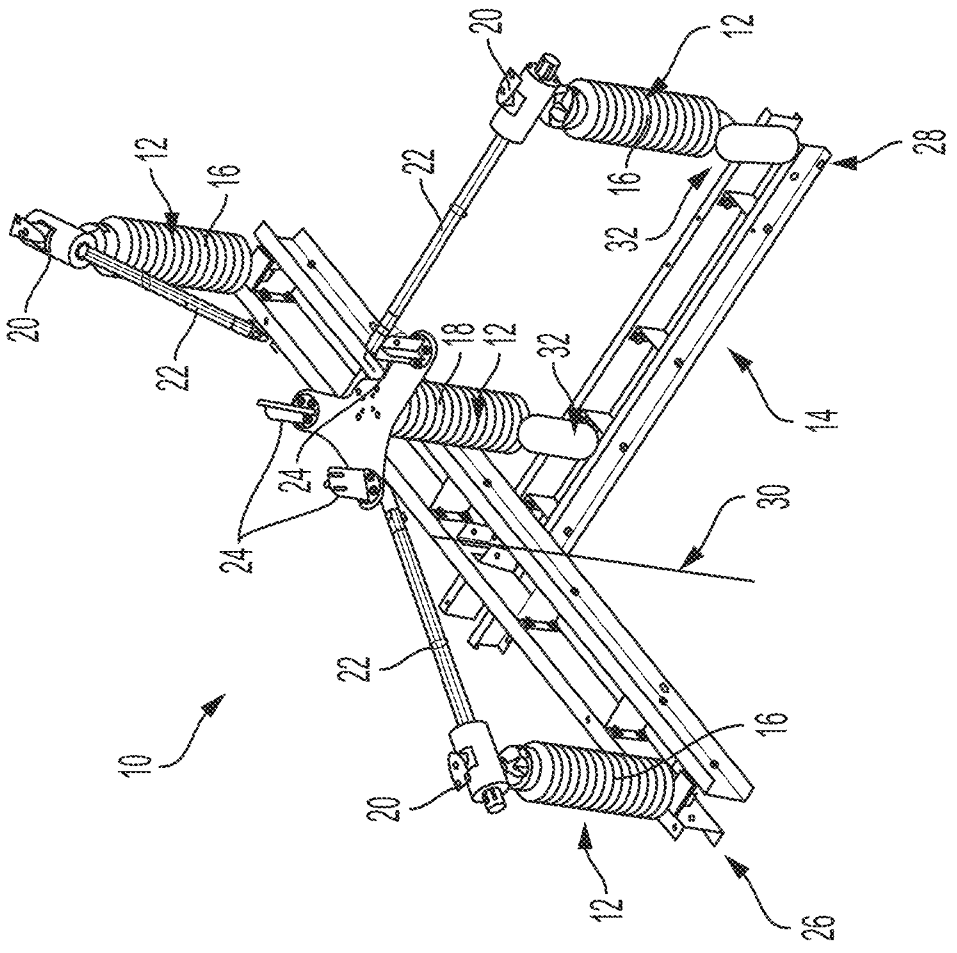
FIGS. 1*a*-1*b* are top perspective views of an electrical switch gear assembly according to the present disclosure shown in an unfolded state.
Figure 1B:
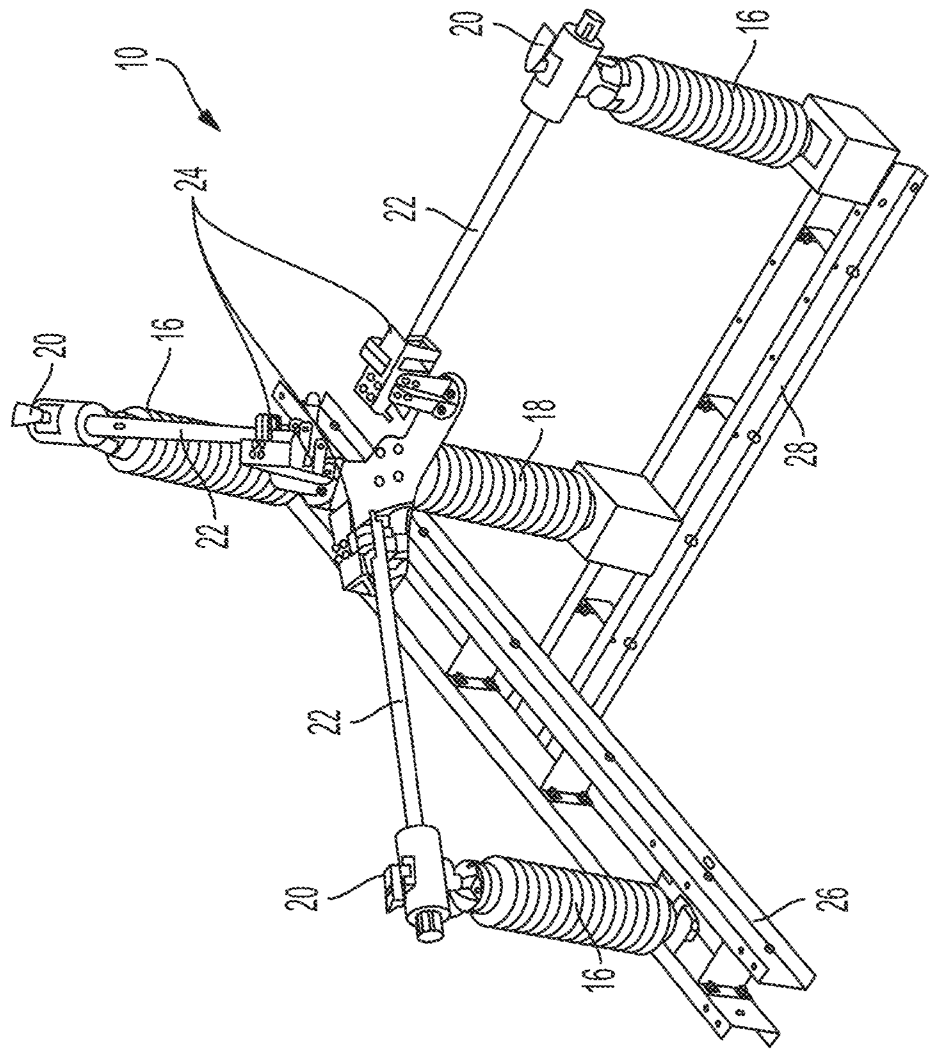
Figure 2A:
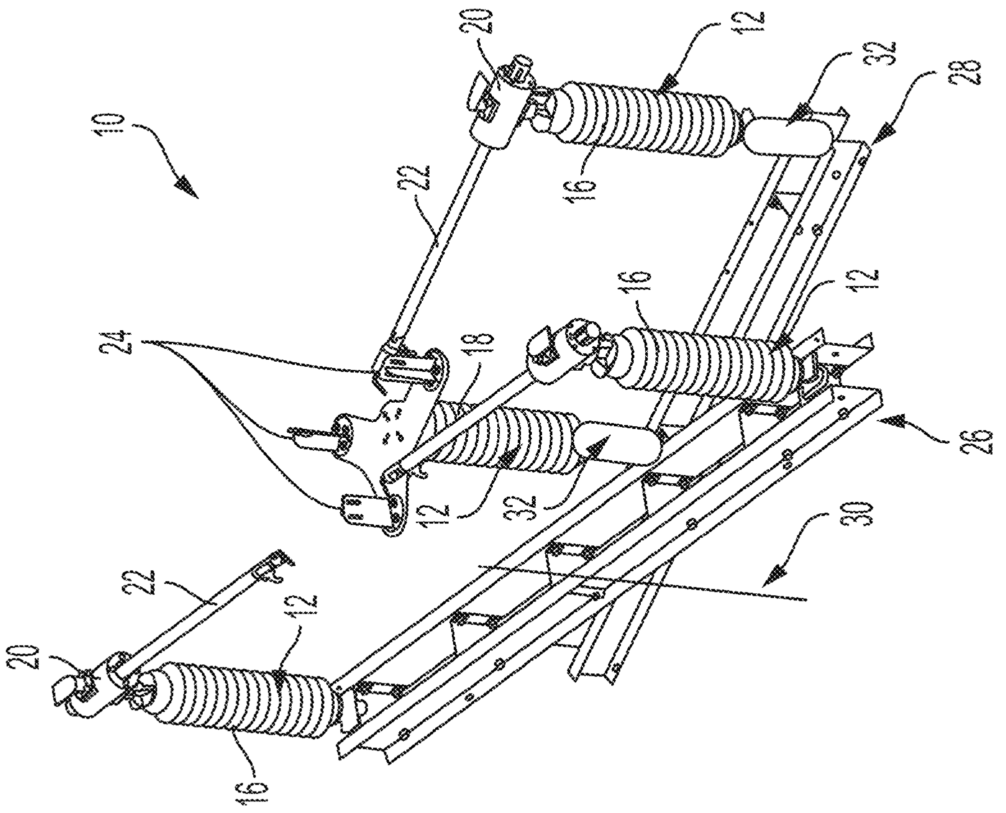
FIGS. 2*a*-2*c* are top perspective views of the assembly of FIGS. 1*a* and 1*b* shown in a folded state.
Figure 2B:
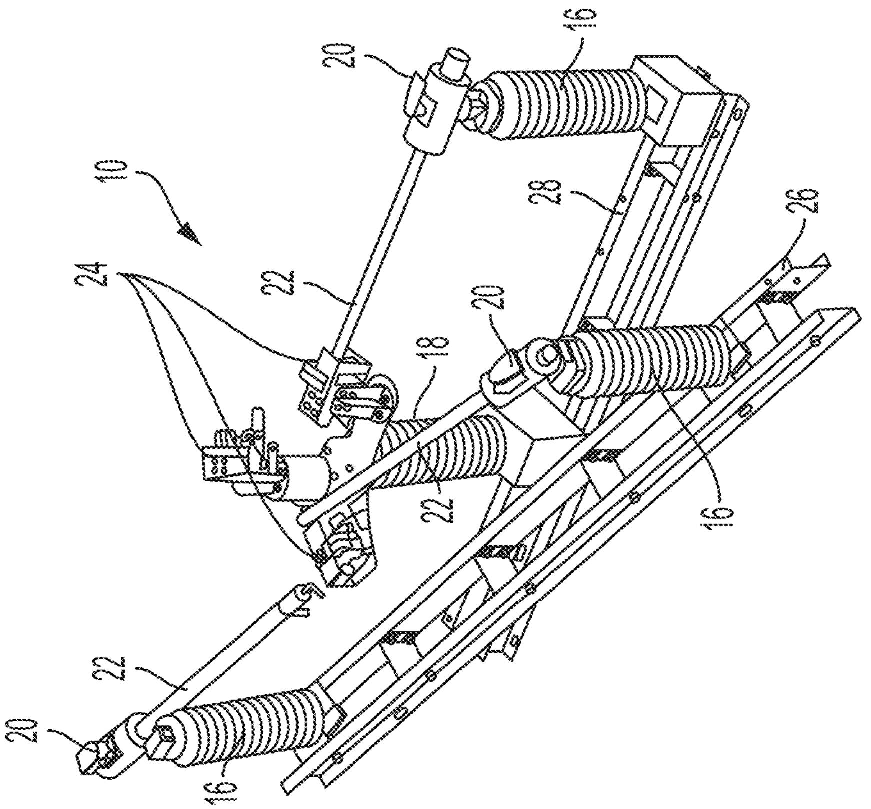
Figure 2C:
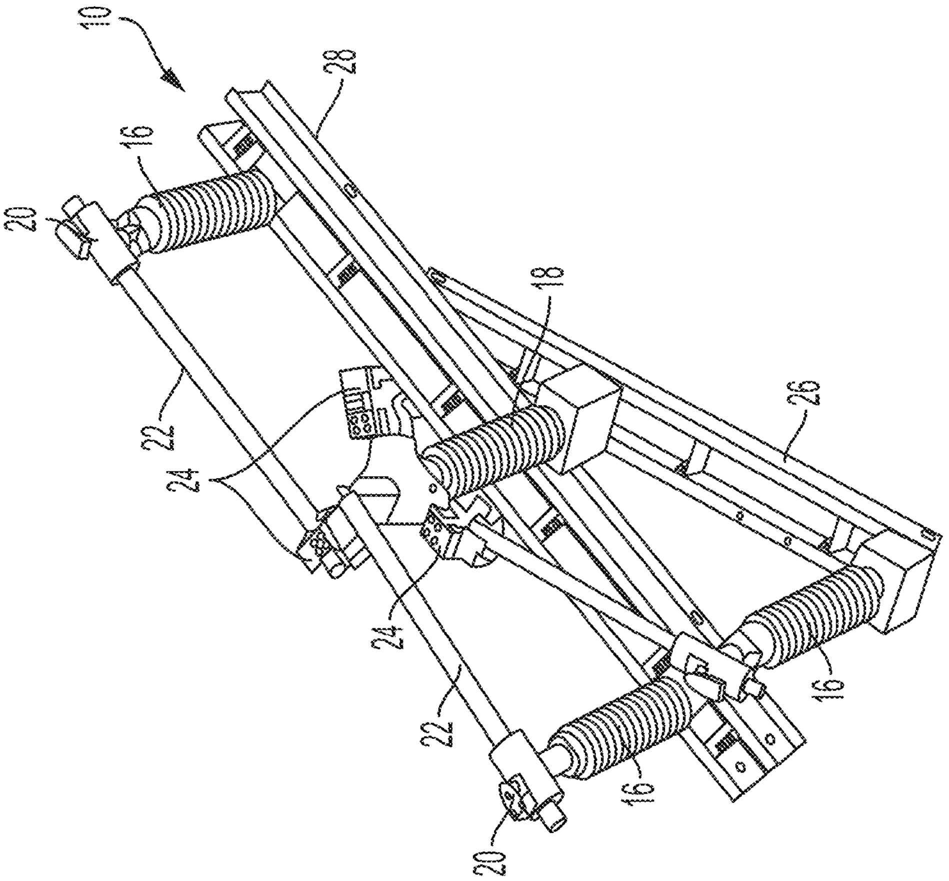
Figure 3A:
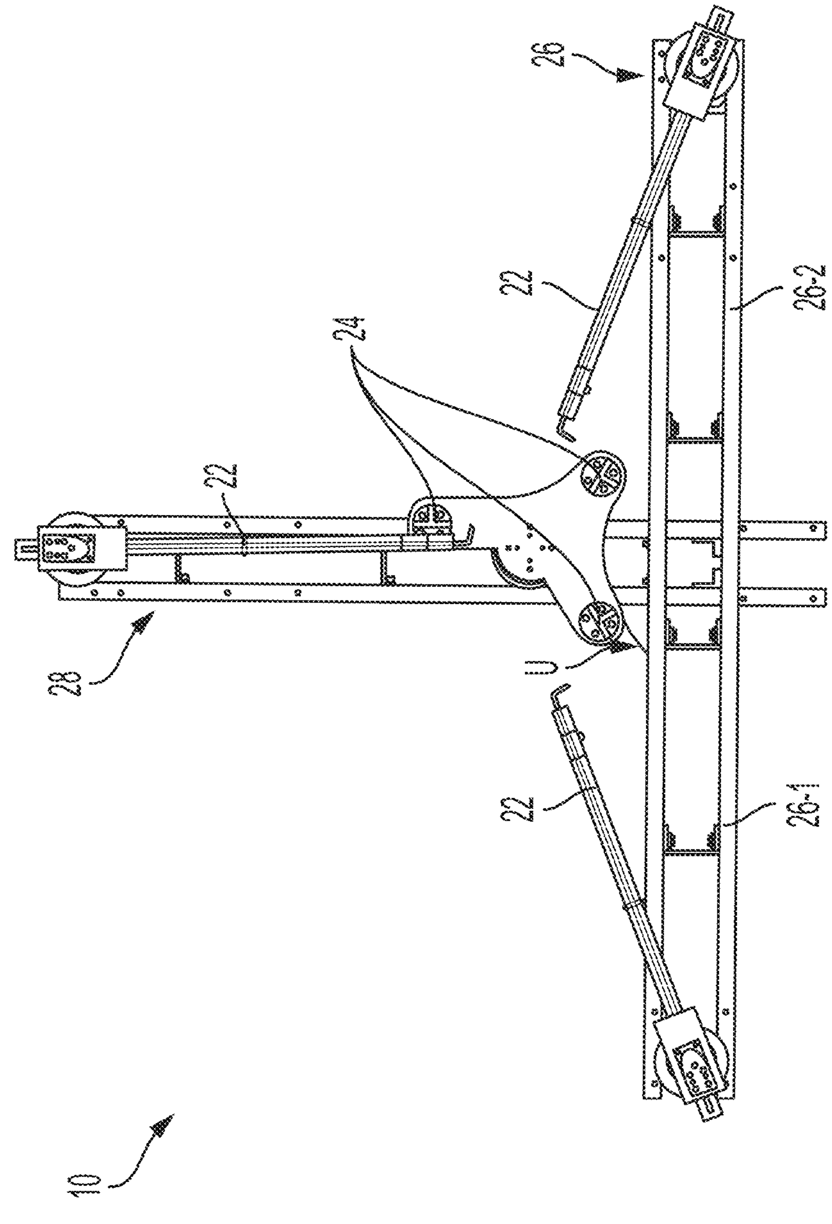
FIGS. 3*a*-3*b* are top views of the assembly of FIGS. 1*a*-1*b* shown in the unfolded state.
Figure 3B:
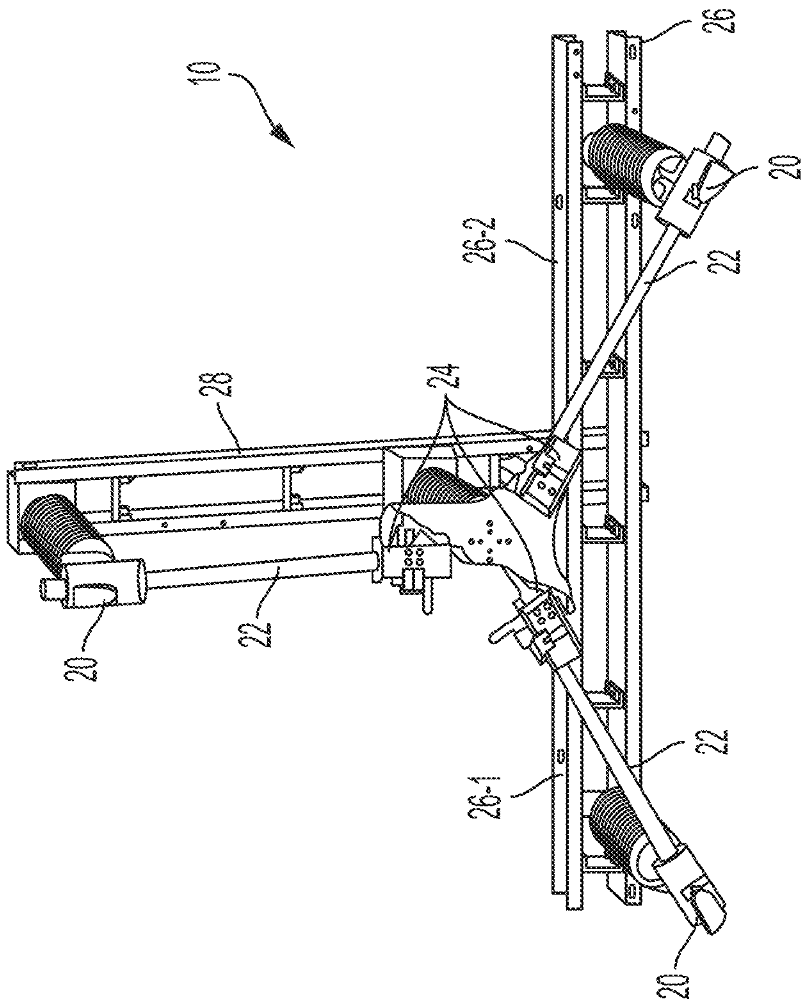
Figure 4A:
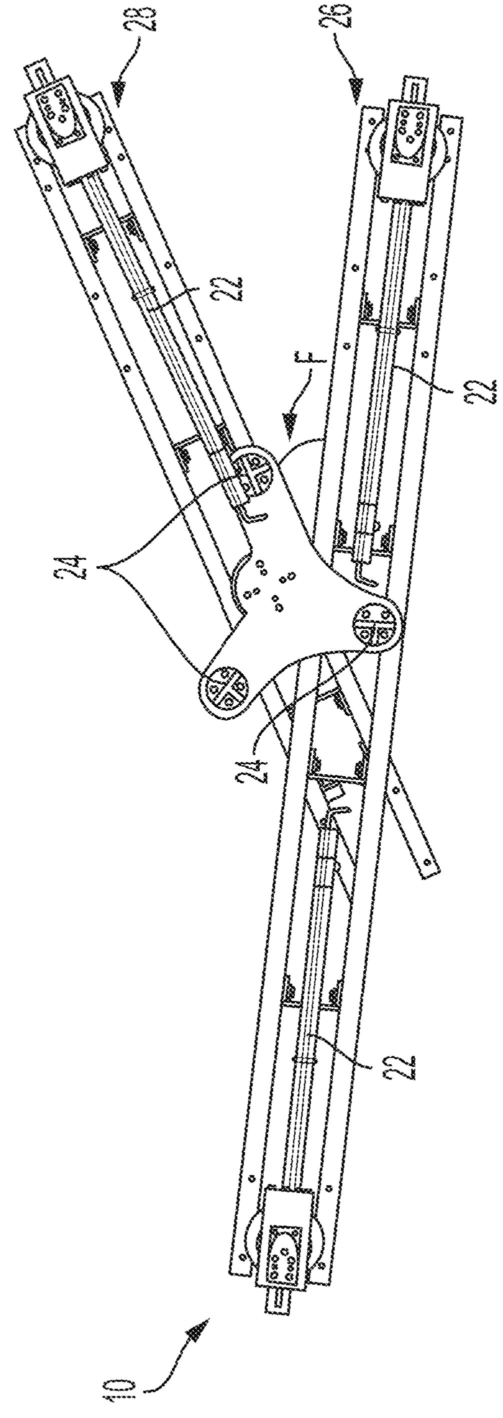
FIGS. 4*a*-4*b* are top views of the assembly of FIGS. 2*a*-2*c* shown in the folded state.
Figure 4B:
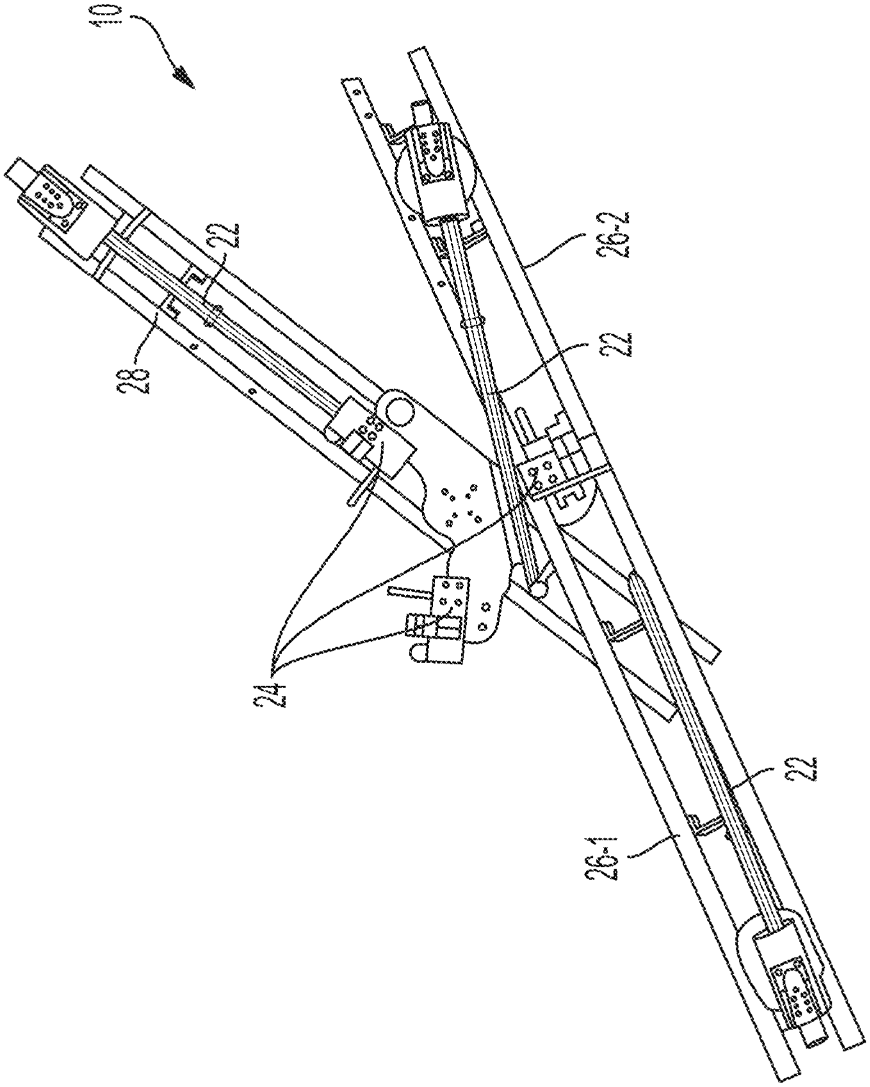

Referring to the drawings and in particular to FIGS. 1*a*-4*b*, an exemplary embodiment of an electrical switch gear assembly according to the present disclosure is shown and is generally referred to by reference numeral 10. Advantageously, assembly 10 is configured to move between a folded state (FIGS. 2*a*-2*c* and 4*a*-4*b*) and an unfolded state (FIGS. 1*a*-1 and 3*a*-3*b*).

In this manner, assembly 10 can be folded for shipment on a standard truck without disassembly and then unfolded by the customer with little to no assembly on site. The customer avoids missing parts and incorrectly assembled parts, while allowing for easy shipment to the site and easy installation at the site.

In the illustrated embodiment, assembly 10 provides a transmission frame for three-switch-per-phase high voltage switchgear that allows for the ability to pack for compact shipping on a truck, easy field assembly by the customer, and stability and no loss of performance due to field application of line tension per NEMA requirements.

Assembly 10 includes of two or more insulators 12 (four shown) and a frame 14. Frame 14 can be configured to mount insulators 12 to any desired structure and in any desired orientation, including horizontal mountings, vertical mountings, or inverted mountings. In the illustrated embodiment, assembly 10 is shown with insulators 12 mounted in the vertical position.

Insulators 12 can be any desired switching insulator such as, but not limited to, those commercially available from Applicant of the present application, Hubbell Incorporated.

In the illustrated embodiment, assembly 10 is shown with four insulators 12 where three of the insulators are phase insulators 16 and one of the insulators is a central insulator 18. Of course, it is contemplated by the present disclosure for assembly 10 to have more or less than three phase insulators 16.

Phase insulators 16 each include a phase tap 20 and a blade 22. Blades 22 can be pivoted at phase insulators 16 to selectively connect/disconnect taps 20 to/from central taps 24 of central insulator 18 in a known manner. Pivoting of blades 22 can be any known pivoting action such as, but not limited to, manual switching, automatic switching, and combinations thereof. Thus, assembly 10 is configured so that blades 22 pivot between a closed position (FIGS. 1*a*-1*b* and 3*a*-3*b*) and an open position (FIGS. 2*a*-2*c* and 4*a*-4*b*). It should be recognized that insulators 14, 16 are shown by way of example without the typical jaw assemblies (e.g., switching and pivoting structures not shown).

Advantageously, frame 14 is configured to pivot in a scissors action. In the unfolded state, the frame can have a T-shape and/or, in the folded state, the frame can have a collapsed X-shape.

In the unfolded state, first beam 26 has portions 26-1, 26-2 on either side of second beam 28 and has unfolded angle (U) between the beams of between 70 and 110 degrees, or between 80 and 100 degrees, or between 85 and 95 degrees, or about 90 degrees.

In the folded state, first and second beams 26, 28 have a folded angle (F) between the beams of between larger than 0 degrees and less than 70 degrees, or between 10 and 60 degrees, or between 20 and 50 degrees, or about 35 degrees. As for the minimum folded angle (F) between first and second beams 26, 28 in the folded state, the minimum angle is defined by the interference or contact of insulators 12 and beams 26, 28.

Specifically, frame 14 has a first beam 26 and a second beam 28 that pivot with respect to one another about a single pivot axis 30. Here, beams 26, 28 are shown offset—along single pivot axis 30—with respect to one another to allow clearance for the scissor movement of the beams with respect to one another. Of course, other configurations of beams 26, 28 are contemplated that allow pivoting movement of the beams about axis 30 without the offset along the axis—an example of which is discussed in more detail with respect to FIGS. 8-9 below.

Figure 7:
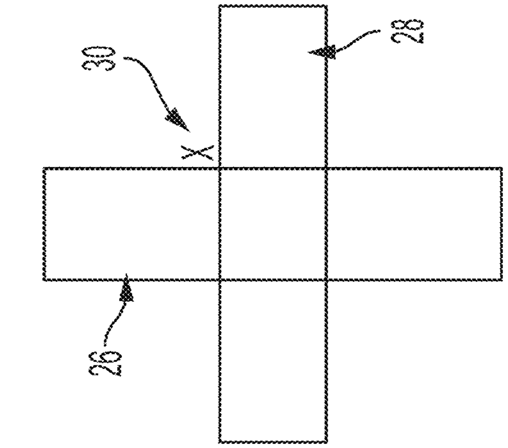
FIGS. 5-7 illustrate different pivot axis locations for the assembly of FIGS. 1*a*-1*b;*
Figure 6:
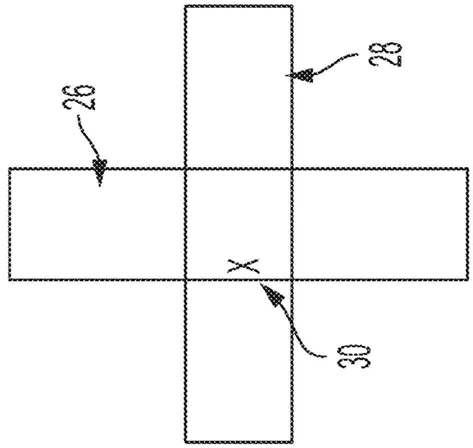
Figure 5:
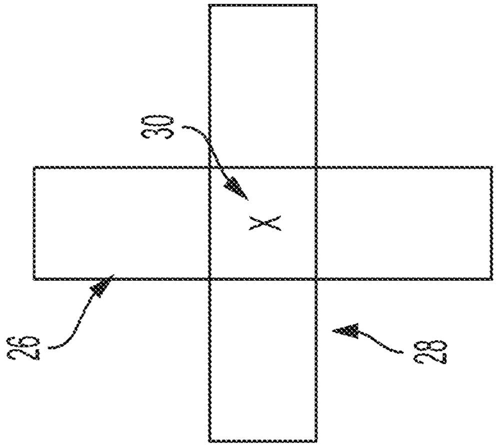

Pivot axis 30 can be in any desired location with respect to beams 26, 28—provided that the pivot axis is a single axis. For example, in some embodiments, pivot axis 30 can be located through a center of both beams 26, 28 as shown in FIG. 5. In other embodiments, pivot axis 30 can be located through a center of only one of beams 26, 28 as shown in FIG. 6. In still other embodiments, pivot axis 30 can be offset from a center of both beams 26, 28 as shown in FIG. 7.

In some embodiments, insulators 16, 18 include jaw assemblies (e.g., switching and pivoting structures not shown) so that taps 20, 24 are co-planar to one another. In other embodiments either alone or in combination with the jaw assemblies, assembly 10 includes mounts 32 for insulators 16, 18 on beam 28 so that taps 20, 24 are co-planar to one another. In other embodiments, mounts 32 can be between insulators 16, 18 and taps 20, 24, respectively so that taps 20, 24 are co-planar to one another. In still other embodiments, insulators 16, 18 on beam 28 can be elongated with respect to insulators 16 on beam 26 so that taps 20, 24 are co-planar to one another. Moreover, it is contemplated by the present disclosure for taps 20, 24 to not be co-planar to one another—with blades 22 having sufficient curvature and/or flexibility to selectively interconnect the taps as desired.

Folding and unfolding of assembly 10 is very easily accomplished. During folding of assembly 10, blades 22 can be separated from taps 24 and beams 26, 28 are pivoted with respect to one another about single pivot axis 30 to the folded state. In some embodiments, assembly 10 can include a connector (not shown) that maintains beams 26, 28 in the folded state.

During unfolding of assembly 10, beams 26, 28 are pivoted with respect to one another about single pivot axis 30 to the unfolded state and blades 22 can be connected to taps 24. In some embodiments, assembly 10 can include a connector (not shown) that maintains beams 26, 28 in the unfolded state.

Once in the unfolded state, assembly 10 can be secured to a utility pole or support structure (not shown). For example, assembly 10 can have mounts (not shown) that secure first beam 26 to the structure, can have mounts (not shown) that secure second beam 28 to the structure, can have mounts that secure both beams 26, 28 to the structure.

Frame 14 is illustrated in FIGS. 1-4 as having beams 26, 28 configured as double c-channels. Of course, other configurations of beams 26, 28 are contemplated by the present disclosure.

Figure 9:
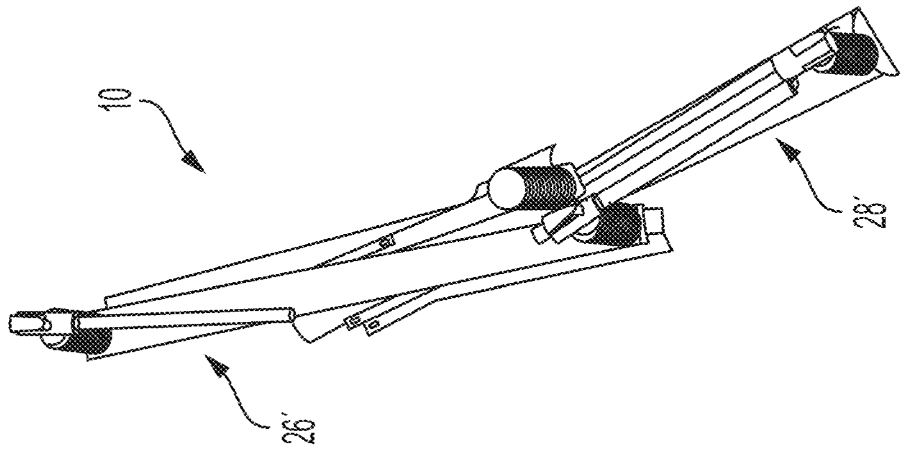
FIG. 9 is a top perspective view of the assembly of FIG. 8 shown in a folded state.
Figure 8:
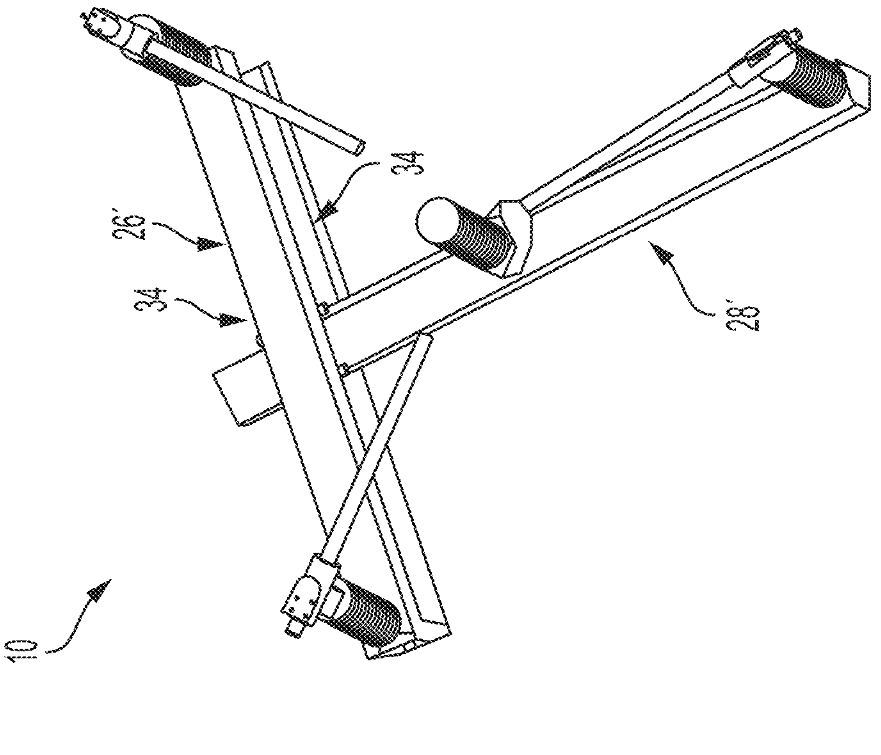
FIG. 8 is a top perspective view of an alternate embodiment of an electrical switch gear assembly according to the present disclosure shown in an unfolded state.

For example, and with respect to the embodiment of assembly 10 shown in FIGS. 8-9, assembly 10 is illustrated having beams 26', 28' configured as box channels having any desired cross section such as but not limited to square or rectangular. In this embodiment, beam 26' is illustrated having one or more open sides 34 at least in some regions that allow beam 28' to pass through beam 26'. Thus, in this embodiment, support beams 26', 28' are not offset along single pivot axis 30 from one another as discussed above with respect to the embodiment in FIGS. 1-4.

It should be recognized that it is contemplated by the present disclosure for beams 26, 26', 28, 28' to have any desired configuration and/or material that provides sufficient strength to support insulators 12 during assembly, shipping, installation, and use—as well as to pivot about single axis 30 during folding and unfolding.

It should also be noted that the terms “first”, “second”, “third”, “upper”, “lower”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST electrical switch gear assembly 10
insulators 12
frame 14
phase insulators 16
central insulator 18
phase tap 20
blade 22
central taps
first beams 26
second beam 28
single pivot axis 30
mounts 32
beams 26', 28'
open side 34

What is claimed is:

1. An electrical switch gear assembly, comprising:
two or more insulators;
a frame having a first beam and a second beam, the two or more insulators being connected to the frame; and
a single pivot axis securing the first and second beams to one another so that the first and second beams can move in a scissors action between a folded state and an unfolded state about the single pivot axis.

2. The assembly of claim 1, wherein the frame is configured to mount to a structure and in an orientation selected from a group consisting of a horizontal mount, a vertical mount, and an inverted mount.

3. The assembly of claim 1, wherein the two or more insulators comprises at least one phase insulator and at least one central insulator.

4. The assembly of claim 1, wherein the two or more insulators comprises three phase insulators and one central insulator.

5. The assembly of claim 1, wherein, in the unfolded state, the frame has a T-shape.

6. The assembly of claim 1, wherein, in the unfolded state, the frame has a collapsed X-shape.

7. The assembly of claim 1, wherein, in the unfolded state, the first beam has portions on either side of the second beam.

8. The assembly of claim 1, wherein the frame, in the unfolded state, has an unfolded angle between the first and second beams of between 70 and 110 degrees.

9. The assembly of claim 1, wherein the frame, in the unfolded state, has an unfolded angle between the first and second beams of about 90 degrees.

10. The assembly of claim 1, wherein the frame, in the folded state, has a folded angle between the first and second beams of between larger than 0 degrees and less than 70 degrees.

11. The assembly of claim 1, wherein the frame, in the folded state, has a folded angle between the first and second beams of between 20 and 50 degrees.

12. The assembly of claim 1, wherein the first and second beams are offset from one another along the single pivot axis, one of the at least two insulators being on the first beam and another of the at least two insulators being on the second beam.

13. The assembly of claim 12, further comprising a tap on each of the at least two insulators and a blade configured to connect/disconnect the tap of the at least two insulators to one another.

14. The assembly of claim 13, wherein the tap of the at least two insulators are coplanar to one another.

15. The assembly of claim 1, wherein the single pivot axis is at a location selected from a group consisting of through a center of the first and second beams, through a center of the first or second beams, and offset from a center of the first and second beams.

16. An electrical switch gear assembly, comprising:

three tap insulators;

one central insulator; and a frame having a first beam and a second beam, the three tap insulators and the one central insulator being connected to the frame, wherein the frame consists of a single pivot axis securing the first and second beams to one another so that the first and second beams can move in a scissors action between a folded state and an unfolded state about the single pivot axis.

17. The assembly of claim 16, wherein, in the unfolded state, the first beam has portions on either side of the second beam.

18. The assembly of claim 17, wherein one of the three tap insulators is on one of the portions, another of the three tap insulators is on another of the portions, a final of the three tap insulators is on the second beam, and the one central insulator is on the second beam.

19. A method of installing a switch gear assembly, comprising:

pivoting first and second beams of a frame with respect to one another about single pivot axis from a folded state to an unfolded state, the frame having, in the unfolded state, portions of the first beam on either side of the second beam with a first tap insulator on one of the portions, a second tap insulator is on another of the portions, a third tap insulator is on the second beam, and a central insulator is on the second beam, and the frame having, in the folded state, a folded angle between the first and second beams of between larger than 0 degrees and less than 70 degrees; and connecting blades between taps on each of the first, second, and third tap insulators to a corresponding number of taps on the central insulator.

20. The method of claim 19, further comprising securing the frame to a utility pole or support structure.

21. An electrical switch gear assembly, comprising:

two or more insulators;

a frame having a first beam and a second beam, the two or more insulators being connected to the frame; and a single pivot axis securing the first and second beams to one another so that the first and second beams can move in a scissors action between a folded state and an unfolded state about the single pivot axis, wherein the frame, in the folded state, has a folded angle between the first and second beams of between larger than 0 degrees and less than 70 degrees.

22. An electrical switch gear assembly, comprising:

two or more insulators;

a frame having a first beam and a second beam, the two or more insulators being connected to the frame; and a single pivot axis securing the first and second beams to one another so that the first and second beams can move in a scissors action between a folded state and an unfolded state about the single pivot axis, wherein the frame, in the folded state, has a folded angle between the first and second beams of between larger than 0 degrees and less than 70 degrees, wherein the frame, in the folded state, has a folded angle between the first and second beams of between 20 and 50 degrees.

* * * * *